P. J. FITZGERALD & J. McINNES.
Liquid-Measuring Can.
No. 222,263. Patented Dec. 2, 1879.
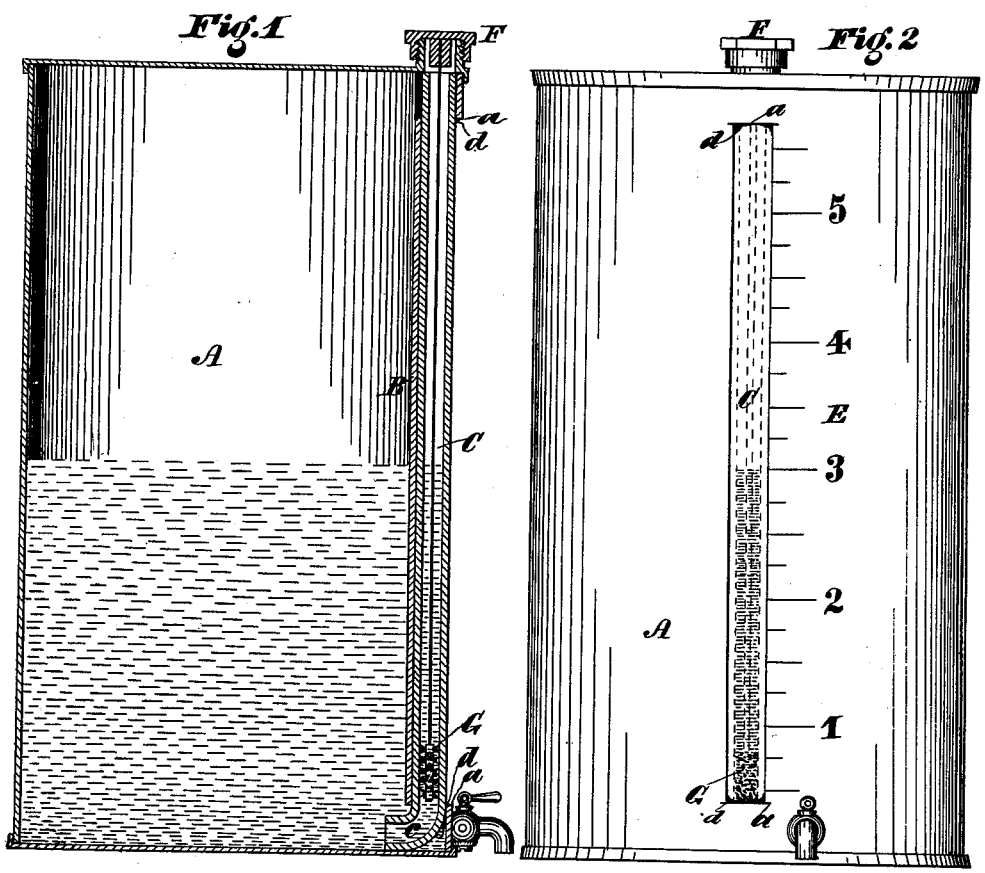
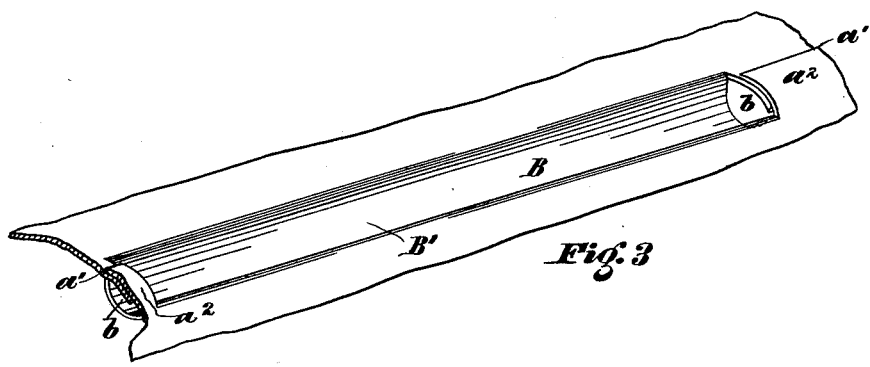
WITNESSES:
INVENTORS,
ATTORNEYS.

UNITED STATES PATENT OFFICE.

PETER J. FITZGERALD AND JOHN McINNES, OF PHILADELPHIA, PENNSYLVANIA; SAID McINNES ASSIGNOR TO SAID FITZGERALD.

IMPROVEMENT IN LIQUID-MEASURING CANS.

Specification forming part of Letters Patent No. 222,263, dated December 2, 1879; application filed May 5, 1879.

*To all whom it may concern:*

Be it known that we, PETER J. FITZGERALD and JOHN McINNES, of Philadelphia, in the county of Philadelphia and State of Pennsylvania, have invented certain new and useful Improvements in Cans, &c.; and we do hereby declare the following to be a full, clear, and exact description of the invention, such as will enable others skilled in the art to which it pertains to make and use it, reference being had to the accompanying drawings, which form part of this specification, in which—

Figure 1 is a longitudinal vertical section of an oil-can, showing our improvements applied thereto. Fig. 2 is a front elevation of the same; and Fig. 3 is a detail perspective, showing the manner of forming the ditch or recess in the side of the can to receive the gage-tube.

Our invention has for its object to provide means for permitting visual inspection of the extent or quantity of the fluid contents of cans and other like vessels; and our improvements relate to the provision in a metallic vessel of a gage made of glass or equivalent transparent material, the vessel being constructed to receive the gage within its perimeter, and said gage being fastened by means of cement or equivalent, as hereinafter fully set forth.

Referring to the accompanying drawings, A indicates a can or equivalent vessel, such as is or may be used for the holding and transportation of oil, varnish, spirits, milk, &c.

Two lateral incisions are made near the top and bottom edges of the can, as shown at $a\,a$, and two vertical incisions, $a'\,a'$, the metal between said lateral incisions, indicated by the letter B in Fig. 3, being depressed or pushed inwardly to form a concave niche, B', in the side of the can, said niche being open at top and bottom, as shown at $b\,b$, the metal above said niche, bounded on two sides by the incisions $a\,a'$, being lapped, as at $a^2$, Fig. 3.

C represents a glass tube, or tube of equivalent transparent material, located in said niche B', being inserted in position by passing it endwise through the openings $b\,b$. When so located said tube is fastened in position and rendered tight to avoid leakage by cement applied at $d\,d$. Such cement should be of such character that it will be impervious to the action of the fluids which the can is designed to hold.

For milk-cans the cement ordinarily employed in households for domestic purposes, *i. e.*, the sealing of fruit-jars, &c., will suffice; but for petroleum and its products, such article will not answer, and in such case we use a peculiar cement, the composition of which we reserve as subject-matter for another application for patent.

The lower end of the tube C communicates with the interior of the vessel A, and may, if desired, have a short bend, $c$, but such bend is not absolutely necessary. The exterior wall of the vessel adjacent to the niche B' and tube C is provided with a scale, E, shown in Fig. 2, to indicate pints, quarts, gallons, or fractional parts thereof.

By preference, the filling-neck, shown at F, is directly over the tube C, so that the latter may be cleaned by a brush, G, passed down through the latter, as shown plainly in Fig. 1. The tube C is of such diameter that, fitted in the niche B' and backed by the metal B, its outer face will be within the perimeter of the vessel A, hence forming no projection, and avoiding in great measure all danger of breakage in transportation or from contact with passing objects, danger to which a projecting gage applied in the usual manner would be constantly liable.

The quantity of fluid contents of the vessel will be ascertained by an inspection of the gage E, and hence no measure will be required to be used in filling. The provision of the gage will also enable purchasers to see that they get full measure, a fact outside of mere visual inspection in ordinary metallic vessels unprovided with gages, where the sufficiency of the amount supplied by a vendor can be ascertained only by pouring out and remeasuring the contents of a vessel.

In some cases, as for example in milk-cans, the provision of the gage will permit inspection of the quality or condition of the fluid in the vessel as well as of its quantity.

What we claim as our invention is—

The vessel A, incised at *a a*, and having its wall between said incisions depressed or pushed back to form a concave niche, open at top and bottom, in combination with a transparent tube, C, fastened therein by cement or equivalent means, substantially as set forth.

In testimony that we claim the foregoing we have hereunto set our hands this 3d day of May, 1879.

PETER J. FITZGERALD.
JOHN McINNES.

Witnesses:
AL. P. BURCHELL,
S. J. VAN STAVOREN.